United States Patent [19]
Desubijana et al.

[11] Patent Number: 5,649,096
[45] Date of Patent: Jul. 15, 1997

[54] BUS REQUEST ERROR DETECTION

[75] Inventors: Joseba Mirena Desubijana, Minneapolis; Wayne Alan Michaelson, Circle Pines; Howard Huy Phung Tran, Woodbury, all of Minn.

[73] Assignee: Unisys Corporation, Blue Bell, Pa.

[21] Appl. No.: 510,283

[22] Filed: Aug. 2, 1995

Related U.S. Application Data

[63] Continuation of Ser. No. 155,352, Nov. 22, 1993, abandoned.

[51] Int. Cl.[6] ................................................. G06F 11/00
[52] U.S. Cl. ......................... 395/183.19; 395/185.09; 364/240.5
[58] Field of Search ............................ 395/575, 200, 395/550, 325, 425, 183.09, 185.09, 185.08, 285; 364/230.3, 240.3, 240.5, 267, 267.9; 371/16.3, 16.1

[56] References Cited

U.S. PATENT DOCUMENTS

| | | | |
|---|---|---|---|
| 4,117,459 | 9/1978 | Douglas et al. | 371/16.1 |
| 4,220,990 | 9/1980 | Alles | 364/200 |
| 4,486,829 | 12/1984 | Mari et al. | 364/200 |
| 5,301,329 | 4/1994 | Frame et al. | 364/267 |
| 5,412,803 | 5/1995 | Barton | 395/575 |

Primary Examiner—Robert W. Beausoliel, Jr.
Assistant Examiner—Trinh L. Tu
Attorney, Agent, or Firm—Charles A. Johnson; Mark T. Starr

[57] ABSTRACT

A micro code operated microsequencer that includes a monitor, a timer, a function controller and an address controller controls the functioning of a number of operational stations which exchange address and data signals with the microsequencer over a bus. The stations have designated tasks to perform and are selectable by the controller. When the station selected performs a task that requires a read from a RAM memory, the microsequencer selects a time-out duration during which the selected station is expected to complete its assigned task which is long enough to take into account the added time needed to perform the read from memory. If the station selected performs a write task, the microsequencer selects a shorter time duration during which the selected station is expected to complete this task since no memory read is needed. If any assigned task exceeds its appropriate time-out duration, an error condition will be sensed and the microsequencer will not receive an active Continue signal from the selected stations as long as their assigned tasks remain uncompleted.

5 Claims, 2 Drawing Sheets

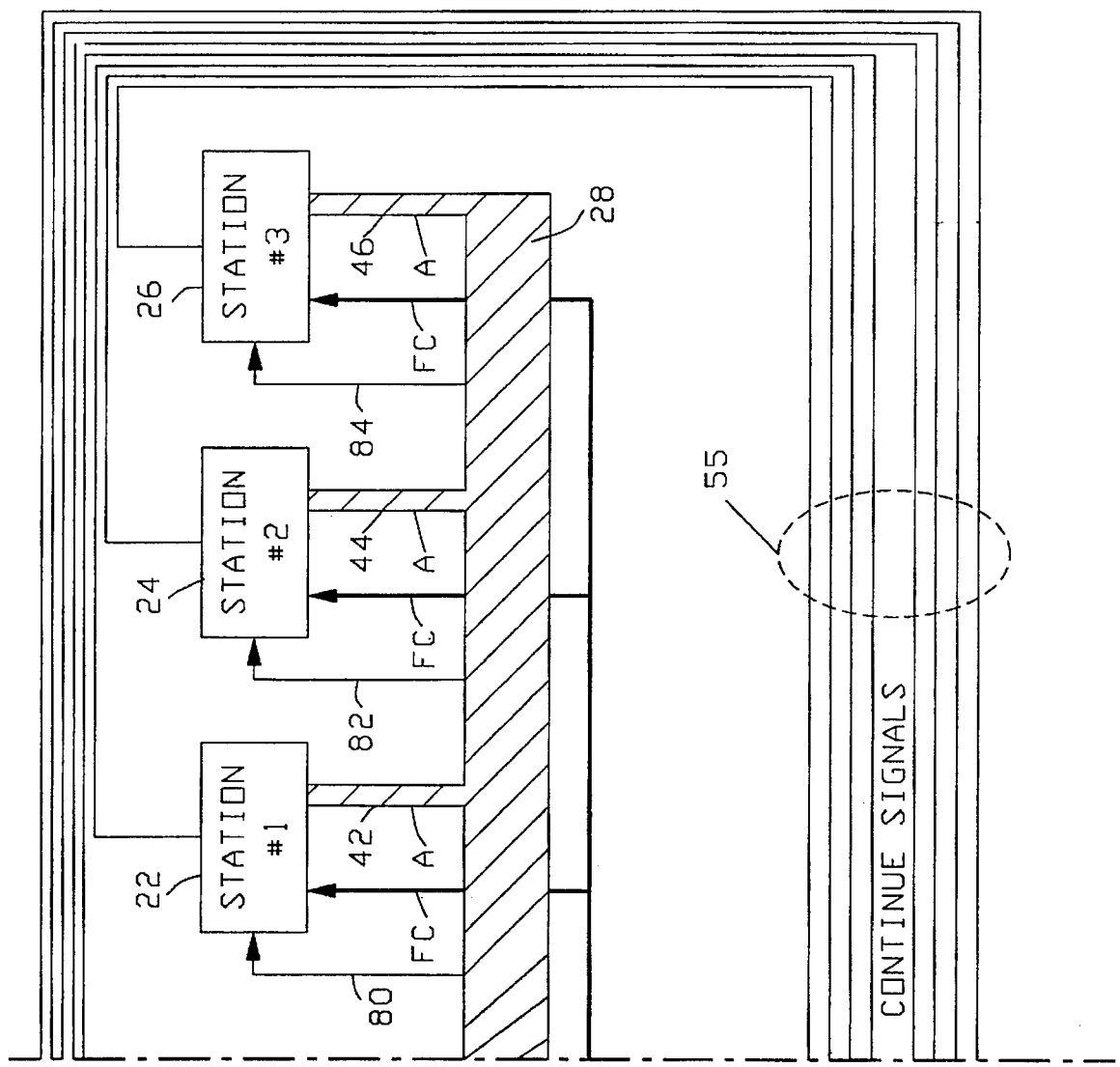

BUS REQUEST ERROR DETECTION

This is a continuation of application Ser. No. 08/155,352 filed on Nov. 22, 1993 now abandoned.

This invention relates to the establishment of communications between data processing elements in which signals are sent back and forth between the elements to establish and verify the communication of information. In particular, the invention relates to a system wherein a microsequencer is coupled to a bus which links a number of stations or processing arrays to the microsequencer.

BACKGROUND OF THE INVENTION

The establishment of communications between microprocessors or microsequencers and other data processing units have long used the handshake technique. In this technique a request for access to a particular unit is made to the microprocessor or microsequencer and an acknowledge signal is sent back from the correct station when the communication channel is initiated. A simple handshake arrangement is adequate for many applications, but it is not suitable for very high speed operation when a microprocessor or microsequencer is coupled to a multiple number of functioning stations.

BRIEF DESCRIPTION OF THE DRAWINGS

The invention is shown by reference to the drawings in which:

FIG. 1 shows the arrangement of FIGS. 1A and 1B relative to each other; and

FIGS. 1A and 1B show a block diagram of an embodiment of the invention in which a microsequencer is functionally connected to eight operating stations.

SUMMARY OF THE INVENTION

Figure 1A:
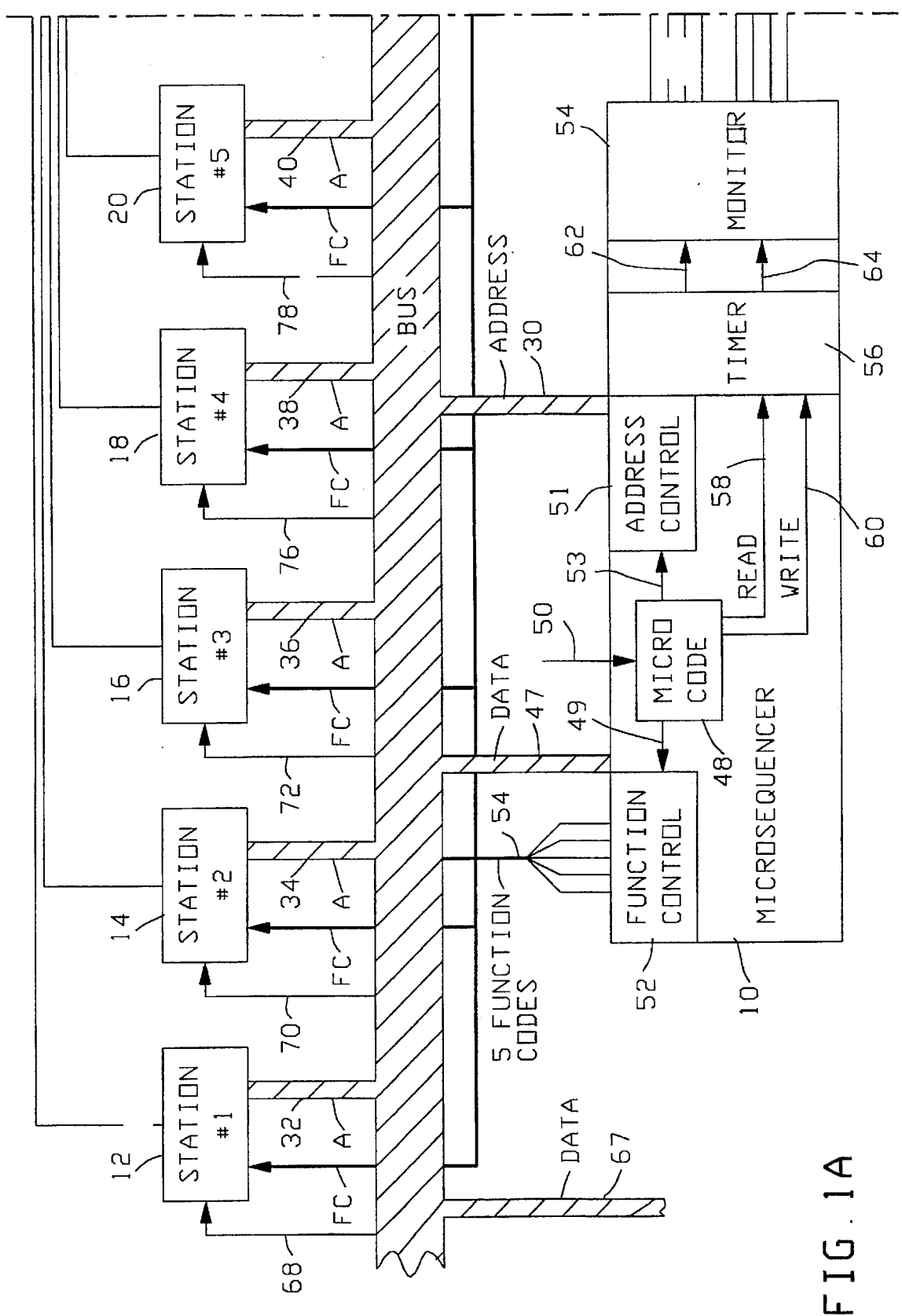

A control unit is provided for a data processing system which has a number of operational units each of which is capable of accomplishing a processing task that is assigned to it by function codes. In this system the operational units are coupled to receive and to transmit address and data signals and to output their own unique continue signal upon completion of a processing task that was assigned to it, and a bus is coupled to all of the operational units for receiving and transmitting the address and data signals between the bus and the operational units. A control unit is also coupled to the bus for transmitting and receiving address and data signals between the bus and the control unit. A plurality of function control lines are coupled between the operational units and the control unit for supplying the function codes from the control unit to the operational unit. The control unit includes a function code generator for assigning processing tasks to the operational units and an address control for generating address signals for selecting those of the operational units which are to perform assigned processing tasks.

The control unit is an improvement of the system and includes a microcode generating unit that is coupled to the function control unit and to the address control unit for controlling the generation of the function control codes and the address signals, and for generating a read signal whenever a generated function code requires a memory read by one of the operational units and for generating a write signal whenever a generated function code requires a write operation by one of the operational units. A timer is coupled to the microcode generating unit for receiving the read and write signals as inputs which provides in response thereto a first halt signal of a first duration whenever a read signal is generated, and a second halt signal of a shorter duration than the first halt signal whenever a write signal is generated. A monitor is coupled to the timer for receiving the first and second halt signals and to all of the operational units for receiving the continue signals from all of the operational units for indicating an error if the first or second halt signal that is associated with an assigned processing task is received by the monitor before the continue signal associated with the same assigned processing task is received by the monitor.

DETAILED DESCRIPTION OF THE INVENTION

The Figure shows a microsequencer which is coupled over a microbus to eight operating stations which are addressable gate arrays each of which has a specific function in the system. The subsystem of the Figure is preferably part of a larger data processing system. In the depicted embodiment, the control element 10 is a microsequencer although it could also be a microprocessor, if desired. In the embodiment the microsequencer does not perform the processing steps but provides the sequence for the program control. Stations 12–26 may be a complete microprocessor, but in the preferred embodiment they are addressable gate arrays which are assigned specific processor functions.

The stations 12–26 are interconnected by a bus 28 which is coupled over the connecting lines 30 to the microsequencer 10, and over the connecting lines 32–46 with the stations 12–26, so that the microsequencer may broadcast a station address across the microbus to all of the stations. In the Figure a single depicted line represents the number of lines required to perform the described function. When the station which corresponds to the address requested by the microsequencer is selected, the station will be able to provide a specific function to the processing system if all of the selection criteria is satisfied. The function control station 52 of the microsequencer 10 receives micro coder on the input lines 49 and generates function codes during the execution of these microcodes in the microcode section 48 under the control of control signals received from other parts of the system on the control lines 50. The microcode section is coupled to the address control section 51 over the lines 53. Data is exchanged between the bus 28 and the microsequencer 10 on the lines 47.

The function control section 52 of the microsequencer is hardwired to all of the stations through the input lines 54. In the described embodiment there are five different function codes that are utilized. These are:

1. Data Source.

This function indicates that the microsequencer is to utilize an operand from a register or a designator that is located in the addressed station which is related to the particular function that the microsequencer will execute.

2. Data Destinate.

This function is generated when the microsequencer is executing an instruction and desires to store the resulting data in a register or a designator located in an addressed station.

3. Branch on External Condition.

This function is generated by the microsequencer when it is executing a branch instruction which tests the state of a designator that is located in the addressed station to determine if a conditional jump is to occur which is dependent upon the condition of the station.

4. Set.

This function is generated by the microsequencer when it is executing a set clear instruction in order to set the state of a designator that is located in an addressed station.

5. Clear.

This function is generated by the microsequencer when it is executing a set clear instruction which clears the state of the designator located in an addressed station.

With eight stations three bits are required to select one of the eight stations at a given time. Once a station has been selected by the address bus and a function code has been sent to that station, the microsequencer 10 will not request another function until it receives a Continue signal from the addressed station over the lines 55. Each of the stations will send out a Continue signal only when the tasks for which it has been activated has been completed.

The monitor 57 monitors all of the Continue signals, even those stations which were not addressed stations. Thus, if one of the non-addressed stations sends a Continue signal, an error has occurred and the microsequencer will halt. The monitor 57 is also coupled to the timer 56 over the lines 62, 64. If the Continue signal is not sent to the microsequencer by an addressed station within a predetermined period of time that should suffice to complete an assigned task, an error will occur due to a time out of the timer 56.

The timer is of conventional design and has two separate timing periods according to whether data must first be read from a random access memory before being supplied to the microsequencer over the control lines 50, or whether the selected task involves a write operation. In the event that the function requires a memory read, a start signal is sent on the line 58 to the timer. Whereas if the function is a write function, a start signal is sent on the line 60 to the timer. The time-out period between the start signal and an electrical output signal for a read function, because of the time required to read from memory, must be longer than the time-out period for a write function. A factor of 2 is employed in the described embodiment so that the time-out period before the monitor issues a Halt signal on the line 62 will be twice as long for a read function as for a write function.

By having the Continue signals indicate that a task is completed before the microsequencer addresses the next station with one of the available function codes, an additional measure of fault tolerance is provided. The corresponding read and write output signals from the timer 56 are supplied on the lines 62, 64, respectively, to the monitor 57. Data is supplied to the stations 12–26 over the cables 68–84, respectively. The microsequencer 10 remains aware of when data is required to be read from a RAM (not shown) over the line 67 by monitoring the specified function required at each of the stations 12–26.

We claim:

1. In a data processing system having a plurality of processors for processing requests indicated by function codes, the plurality of processors being coupled to a bus, the bus having address, data, and control fines, the control lines including a read request line for providing a read function code and a write request line for providing a write function code, and having a control processor coupled to the bus for controlling the selection of a function code and an address of a selected one of the plurality of processors, and for generating a read signal when a selected function code is the read function code and a write signal when a selected function code is the write function code, the control processor including function control circuitry to activate the read request line to request retrieval of data from a selected processor when a selected function code is the read function code and to activate the write request line to request storage of data to a selected processor when a selected function code is the write function code, and address control circuitry to activate the address lines addressing a selected processor, a bus request error detection system comprising:

a plurality of first lines, each of the first lines coupled to an associated one of the plurality of processors tin a first end, each of said plurality of first lines being activated by said associated one of the plurality of processors when selected associated one of the plurality of processors is finished processing a read request or a write request;

first and second halt lines;

timing means coupled to the address control circuitry and said first and second halt lines for receiving the read signal and for providing a first halt signal tin said first halt line in response thereto after a first duration has elapsed, and for receiving the write signal and for providing a second halt signal on said second halt line in response thereto after a second duration has elapsed, said first duration being longer than said second duration; and monitor means coupled to said first and second halt lines and to each one of the plurality of first lines on a second end for continuously monitoring the state of said plurality of the first lines and indicating an error when said first halt signal is received before activation of said first line when said selected function code is a read function code, for indicating said error when said second halt signal is received before activation of said selected first line when said selected function code is a write function code, and for indicating said error when one of said plurality of first lines is activated which is not coupled to the selected processor receiving the selected function code.

2. In a data processing system having a plurality of processors for processing requests indicated by function codes, the plurality of processors being coupled to a bus, the bus having address, data, and control lines, the control lines including a read request line for providing a read function code and a write request line for providing a write function code, having a plurality of first lines, each of the first lines coupled to one of the plurality of processors on a first end, each of the plurality of first lines being activated by a coupled processor when the coupled processor is finished processing a read request or a write request, and having a control processor coupled to the bus and to a second end of each of the first lines to control the plurality of processors, a bus request error detection system comprising:

microcode processing means for controlling the selection of a function code and an address of a selected one of the plurality of processors, and for generating a read signal when a selected function code is the read function code and a write signal when said selected function code is the write function code;

function control means coupled to said microcode processing means, the read request line, and the write request line, for activating the read request line to request retrieval of data from said selected processor when said selected function code is the read function code and for activating the write request line to request storage of data to said selected processor when said selected function code is the write function code:

address control means coupled to said microcode processing means and the address lines for activating the address lines addressing said selected processor, and for indicating a selected one of the plurality of first lines corresponding to said selected processor;

timing means coupled to said microcode processing means and said address control means for receiving said read signal and for providing a first halt signal in response thereto after a first duration has elapsed, and for receiving said write signal and for providing a second halt signal in response thereto after a second duration has elapsed, said first duration being longer than said second duration; and monitor means coupled to said timing means and to each one of the plurality of first lines for continuously monitoring the state of the plurality of the first lines and indicating an error when said first halt signal is received before activation of said first line when said selected function code is a read function code, for indicating selected error when said second halt signal is received before activation of said selected first line when said selected function code is a write function code, and for indicating said error when one of the plurality of first lines is activated which is not said selected first line.

3. In a data processing system having a plurality of addressable gate arrays for processing requests indicated by function codes, the plurality of addressable gate arrays being coupled to a bus, the bus having address, data, and control lines, the control lines including a read request line for providing a read function code and a write request line for providing a write function code, a bus request error detection system comprising:

a plurality of first lines, each of said first lines coupled to an associated one of the plurality of addressable gate arrays on a first end, each of said plurality of first lines being activated by said associated one of the plurality of addressable gate arrays when said associated one of the plurality of addressable gate arrays is finished processing a read request or a write request; and control processing means coupled to the bus and to a second end of each of said first lines for controlling the plurality of addressable gate arrays, said control processing means including microcode processing means for controlling the selection of a function code and an address of a selected one of said plurality of addressable gate arrays, and for generating a read signal when a selected function code is the read function code and a write signal when said selected function code is the write function code;

function control means coupled to selected microcode processing means, the read request line, and the write request line, for activating the read request line to request retrieval of data for said selected addressable gate array when said selected function code is the read function code and for activating the write request line to request storage of data to said selected addressable gate array when said selected function code is the write function code;

address control means coupled to said microcode processing means and the address lines for activating the address lines addressing said selected addressable gate array, and for indicating a selected one of said plurality of first lines corresponding to said selected addressable gate array;

timing means coupled to said microcode processing means and said address control means for receiving said read signal and for providing a first halt signal in response thereto after a first duration has elapsed, and for receiving said write signal and for providing a second halt signal in response thereto after a second duration has elapsed, said first duration being longer than said second duration; and monitor means coupled to said timing means and to each one of said plurality of first lines for indicating a bus error when said first halt signal is received before activation of said first line when said selected function code is a read function code, for indicating said bus error when selected second halt signal is received before activation of said selected first line when said selected function code is a write function code, and for indicating said bus error when one of said plurality of first lines is activated which is not said selected first line.

4. In a data processing system having a plurality of addressable gate arrays for processing requests indicated by function codes, the plurality of addressable gate arrays being coupled to a bi-directional bus, the bi-directional bus having address, data, and control lines, the control lines including a read request line for providing a read request by activating a read function code and a write request line for providing a write request by activating a write function code, a bus request error detection system comprising:

a plurality of continue lines, each of said continue lines coupled to an associated one of the plurality of addressable gate arrays on a first end, each of said plurality of continue lines being activated by said associated one of the plurality of addressable gate arrays when said associated one of the plurality of addressable gate arrays is finished processing a read request or a write request: and a microsequencer coupled to the bi-directional bus and to a second end of each of the continue lines to control the plurality of addressable gate arrays by executing microcode to select a function code and an address of a selected one of the plurality of addressable gate arrays, and to generate a read signal when a selected function code is the read function code and a write signal when said selected function code is the write function code, said microsequencer including function control circuitry coupled to the read request line and the write request line, to activate the read request line to request retrieval of data from said selected addressable gate array when selected function code is the read function code and to activate the write request line to request storage of data to said selected addressable gate array when said selected function code is the write function code;

address control circuitry coupled to the address lines to activate the address lines addressing said selected addressable gate array, and to indicate a selected one of the plurality of continue lines corresponding to said selected addressable gate array;

a timer coupled to said address control circuitry for receiving selected read signal and for providing a first halt signal in response thereto after a first duration has elapsed, and for receiving said write signal and for providing a second halt signal in response thereto after a second duration has elapsed, said first duration being longer than said second duration; and monitoring circuitry coupled to said timer and to each one of the plurality of continue lines for continuously monitoring the state of the plurality of the continue lines and indicating a bus error when said first halt signal is received before activation of said selected continue line when said selected function code is a read function code, for indicating said bus error when said second halt signal is received before activation of said selected continue line when said selected function code is a write function code, and for indicating said bus error when one of the plurality of continue lines is activated which is not said selected continue line, thereby detecting bus access errors.

5. A bus request error detection system comprising:

a plurality of addressable gate arrays to process requests indicated by function codes;

a bi-directional bus coupled to said plurality of addressable gate arrays, said bi-directional bus having address, data, and control lines, said control lines including a read request line for providing a read request by activating a read function code and a write request line for providing a write request by activating a write function code;

a plurality of continue lines, each of said continue lines coupled to an associated one of said plurality of addressable gate arrays on a first end, each of said plurality of continue lines being activated by selected associated one of said plurality of la coupled 1 addressable gate arrays when said associated one of said plurality of addressable gate arrays is finished processing said read request or said write request;

a microsequencer coupled to said bi-directional bus anti to a second end of each of said continue lines to control said plurality of addressable gate arrays by executing microcode to select a function code and an address of a selected one of said plurality of addressable gate arrays, and to generate a read signal on a read line when a selected function code is said read function code and a write signal on a write line when said selected function code is said write function code, selected microsequencer including function control circuitry coupled to said read request line and said write request line, to activate said read request line to request retrieval of data from said selected addressable gate array when said selected function code is selected read function code and to activate said write request line to request storage of data to said selected addressable gate array when said selected function code is said write function code;

address control circuitry coupled to said address lines to activate said address lines addressing said selected addressable gate array, and to indicate a selected one of said plurality of continue lines corresponding to said selected addressable gate array;

timing circuitry coupled to said address control circuitry for receiving said read signal tin said read line and for providing a first halt signal on a first halt line in response thereto after a first duration has elapsed, and for receiving said write signal on said write line and for providing a second halt signal on a second halt line in response thereto after a second duration has elapsed, said first duration being longer than said second duration; and Monitoring circuitry coupled to said timing circuitry and to each one of said plurality of continue lines for continuously monitoring the state of said plurality of said continue lines and indicating a first error when said first halt signal is received before activation of said selected continue line when said selected function code is said read function code, for indicating a second error when said second halt signal is received before activation of selected continue line when said selected function code is said write function code, and for indicating a third error when one of said plurality of continue lines is activated which is not said selected continue line, thereby detecting bus access and timeout errors.

\* \* \* \* \*